(12) United States Patent
Hwang

(10) Patent No.: US 10,103,637 B2
(45) Date of Patent: Oct. 16, 2018

(54) POWER CONVERTER FOR A SWITCHING POWER SUPPLY AND MANNER OF OPERATION THEREOF

(71) Applicant: Champion Microelectronic Corporation, Hsinchu (TW)

(72) Inventor: Jeffrey Hwang, Saratoga, CA (US)

(73) Assignee: Champion Microelectronic Corporation, Hsinchu (TW)

( * ) Notice: Subject to any disclaimer, the term of this patent is extended or adjusted under 35 U.S.C. 154(b) by 0 days.

(21) Appl. No.: 15/615,653

(22) Filed: Jun. 6, 2017

(65) Prior Publication Data
US 2017/0288551 A1 Oct. 5, 2017

Related U.S. Application Data

(63) Continuation-in-part of application No. 14/975,392, filed on Dec. 18, 2015, now Pat. No. 9,716,437.

(51) Int. Cl.
  *H02M 3/335* (2006.01)
  *H01F 27/00* (2006.01)
  *H01F 27/42* (2006.01)

(52) U.S. Cl.
  CPC ........ *H02M 3/3353* (2013.01); *H01F 27/004* (2013.01); *H01F 27/006* (2013.01); *H01F 27/425* (2013.01)

(58) Field of Classification Search
  CPC .. H02M 3/3353; H01F 27/425; H01F 27/004; H01F 27/006
  See application file for complete search history.

(56) References Cited

U.S. PATENT DOCUMENTS

| 5,282,123 | A | 1/1994 | Boylan et al. | |
|---|---|---|---|---|
| 6,856,523 | B2* | 2/2005 | Griffin | H02M 3/33569 363/21.1 |
| 7,518,350 | B2 | 4/2009 | Leung | |
| 8,009,448 | B2* | 8/2011 | Liu | H02M 3/33569 363/21.01 |
| 8,279,637 | B2 | 10/2012 | Ulrich | |
| 9,716,437 | B2 | 7/2017 | Hwang | |
| 2016/0365801 | A1* | 12/2016 | Phadke | H02M 3/33546 |
| 2017/0264206 | A1* | 9/2017 | Rana | H02M 1/083 |

OTHER PUBLICATIONS

Watson et al., "Characterization of an Active Clamp Flyback Topology for Power Factor Correction Applications," IEEE Transactions on Power Electronics, vol. 11, No. 1, Jan. 1996, pp. 191-198.

* cited by examiner

*Primary Examiner* — Emily P Pham
(74) *Attorney, Agent, or Firm* — Westberg Law Offices

(57) ABSTRACT

A switching power supply comprises a power converter that includes a transformer, a low side switch and a high side switch. The low side switch draws current from a supply voltage through a primary winding of the transformer. The high side switch discharges current from the primary winding of the transformer to a snubber capacitor. The controller synchronously controls the opening and closing of the low side switch and the high side switch. The power converter can be included in a flyback converter. The power converter can generate a regulated output voltage.

53 Claims, 13 Drawing Sheets

POWER CONVERTER FOR A SWITCHING POWER SUPPLY AND MANNER OF OPERATION THEREOF

This is a continuation-in-part application of application Ser. No. 14/975,692, filed Dec. 18, 2015, the entire contents of which are hereby incorporated by reference.

BACKGROUND OF THE INVENTION

The present invention relates to the field of switching power supplies. More particularly, the present invention relates to a flyback power converter for a switching power supply and manner of operation thereof.

An off-line switching power supply receives power from an alternating-current (AC) power source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output which can be used to power the load. The rectified output of the PFC stage is typically at higher voltage and is more loosely regulated than the output of the DC-to-DC stage.

A flyback power converter (or, more simply, a flyback converter) can be employed in a DC-to-DC power converter. A flyback converter employs a transformer that transfers energy from the input of the flyback converter to its output and provides electrical isolation between the input and output of the flyback converter. An input voltage, such as the rectified output voltage of a PFC stage, is applied across the transformer primary winding by closing a switch; as a result, a primary winding current flows and magnetic flux in the transformer increases, storing energy in the transformer. When the switch is opened, the voltage is removed and the primary winding current falls while magnetic flux drops. As a result, a current is induced in a secondary winding of the transformer. This induced current charges an output capacitor to generate an output voltage for powering a load.

Switching power supplies can be subjected to a variety of loading conditions. It is important for such power supplies to operate efficiently so as to minimize power usage. Therefore, what are needed are improved techniques for a switching power supply that accommodate different loading conditions and that achieve efficient operation. What are further needed are such techniques for a switching power supply that employs a flyback power converter.

SUMMARY OF THE INVENTION

In accordance with an embodiment, a switching power supply comprises a power converter that includes a transformer, a low side switch and a high side switch. The low side switch draws current from a supply voltage through a primary winding of the transformer. The high side switch discharges current from the primary winding of the transformer to a snubber capacitor. The controller synchronously controls the opening and closing of the low side switch and the high side switch. The power converter can be included in a flyback converter. The power converter can generate a regulated output voltage.

In accordance with a further embodiment, a switching power supply comprises a power converter that includes a transformer, a low side switch and a high side switch. The low side switch is configured to draw current from a supply voltage through a primary winding of the transformer. The high side switch is configured to discharge current from the primary winding of the transformer to a snubber capacitor. A controller is configured to synchronously control the opening and closing of the low side switch and the high side switch. The low side switch and the high side switch are each repeatedly opened and closed so as to form a regulated output voltage in a feedback loop, the output voltage being formed from a current induced in a secondary winding of the transformer. The controller is configured to adjust a time instant of closing the high side switch within each switching cycle upon detection of a one or more of a load condition or a supply voltage condition. The supply voltage condition can be detected by the supply voltage exceeding a threshold value. The load condition can comprise a light load condition.

In accordance with a further embodiment, a switching power supply comprises a power converter that includes a transformer, a low side switch and a high side switch. The low side switch is configured to draw current from a supply voltage through a primary winding of the transformer. The high side switch is configured to discharge current from the primary winding of the transformer to a snubber capacitor. A controller is configured to synchronously control the opening and closing of the low side switch and the high side switch, wherein the low side switch and the high side switch are each repeatedly opened and closed so as to form a regulated output voltage in a feedback loop. The output voltage is formed from a current induced in a secondary winding of the transformer. The controller is further configured to selectively operate in: (1) a frequency control mode in which frequency of switching is controlled in a feedback loop to regulate the output voltage; and (2) a current control mode in which peak current in the primary winding of the transformer for each switch cycle is controlled in a feedback loop for regulating the output voltage. The controller operates in the frequency control mode upon detection of a supply voltage condition. The supply voltage condition can be detected by the supply voltage exceeding a threshold value.

These and other embodiments are disclosed herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

The present invention is directed toward a flyback power converter for a switching power supply and manner of operation thereof. The flyback converter can be employed in an offline switching power supply. In accordance with an embodiment of the present invention, the flyback converter employs two synchronously-operated transistor switches on the transformer primary side. A first of the transistor switches couples the transformer primary winding to a ground node and is referred to herein as the "low side" switch. A second of the two transistor switches couples the transformer primary winding to an input voltage via a snubber capacitor and is referred to herein as the "high side" switch. Switching is controlled in a feedback loop to generate a regulated DC output voltage at the transformer secondary side. In accordance with an embodiment of the present invention, the flyback converter can be operated in a frequency-control feedback loop or a current-control feedback loop, depending upon loading conditions. In accordance with a further embodiment, the flyback converter seamlessly transitions between frequency control and current control feedback loops. In accordance with a further embodiment of the invention, one or both of the low side and high side switches are operated in accordance with zero volt switching (ZVS). These and other aspects of the present invention are described herein.

Figure 1:
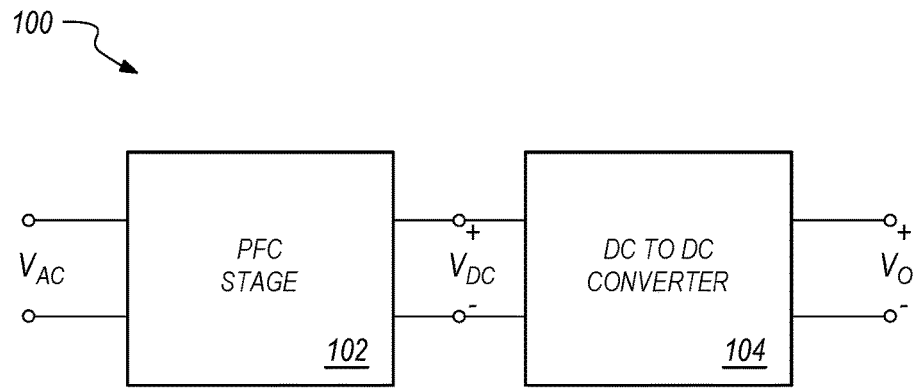
FIG. 1 illustrates a block schematic diagram of a two-stage, off-line power supply in accordance with an embodiment of the present invention.

FIG. 1 illustrates a block schematic diagram of a two-stage, off-line power supply 100 in accordance with an embodiment of the present invention. As shown in FIG. 1, a power factor correction (PFC) stage 102 has an input coupled to alternating-current (AC) source. The PFC stage 102 performs rectification on the AC input signal and maintains current drawn from the AC source substantially in phase with the AC voltage so that the power supply 100 appears as a resistive load to the AC source.

The PFC stage 102 generates a loosely regulated voltage, $V_{DC}$, which is provided as input to a DC-to-DC converter 104. Using the input $V_{DC}$, the DC-to-DC converter stage 104 generates a voltage-regulated, DC output, $V_O$, which can be used to power a load. The level of $V_{DC}$ is preferably at a higher voltage and is more loosely regulated than the output $V_O$ of the DC-to-DC converter stage 104. The nominal level of the output, $V_{DC}$, of the PFC stage 102 may be, for example, approximately 380 volts DC, while the voltage-regulated output $V_O$ of the DC-to-DC converter stage 104 may be, for example, approximately 12.0 volts DC.

Figure 2:
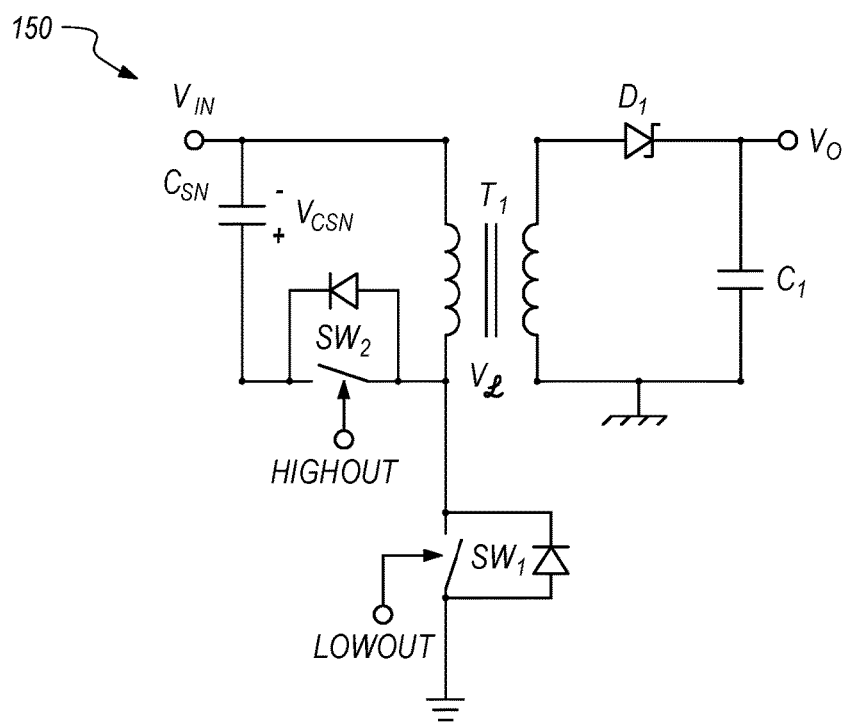
FIG. 2 illustrates a flyback converter suitable for use in a DC-to-DC converter in accordance with an embodiment of the present invention.

FIG. 2 illustrates a flyback converter 150 in accordance with an embodiment of the present invention. The flyback converter is suitable for use in a DC-to-DC converter of a switching power supply, such as the DC-to-DC converter 104 of FIG. 1. The flyback converter 150 receives an input voltage from source $V_{IN}$ that can be a PFC stage output, $V_{DC}$, or that can be received from some other source, such as an electromagnetic interference (EMI) filter.

As shown in FIG. 2, the input voltage source $V_{IN}$ is coupled to a first terminal of a capacitor $C_{SN}$ and to a first terminal of a primary winding of a transformer $T_1$. The capacitor $C_{SN}$ functions as a snubber capacitor. A voltage $V_{CSN}$ having polarity as shown in FIG. 2 is formed across the capacitor $C_{SN}$. A second terminal of the primary winding of the transformer $T_1$ is coupled to a first terminal of a switch $SW_1$ ("low side" switch) and to a first terminal of a switch $SW_2$ ("high side" switch). A voltage $V_R$ is formed at a node between the low side switch $SW_1$ and the high side switch $SW_2$ and at the second terminal of the primary winding of the transformer $T_1$. A second terminal of the switch $SW_1$ is coupled to a first ground node. A second terminal of the switch $SW_2$ is coupled to a second terminal of the capacitor $C_{SN}$. The switches $SW_1$ and $SW_2$ can be implemented as power MOSFET transistors; thus, a body diode is shown associated with each of switches $SW_1$ and $SW_2$. The switch $SW_1$ is controlled by a signal LOWOUT while the switch $SW_2$ is controlled by a signal HIGHOUT.

The low side switch $SW_1$ and the high side switch $SW_2$ are each preferably implemented by a corresponding MOSFET.

A first terminal of a secondary winding of the transformer $T_1$ is coupled to an anode of a Zener diode $D_1$. A cathode of the diode $D_1$ is coupled to a first terminal of a capacitor $C_1$. A second terminal of the secondary winding of the transformer T1 is coupled to a second terminal of the capacitor $C_1$ and to a second ground node. The first and second ground nodes are preferably isolated from each other.

The flyback converter 150 is operated by opening and closing the switches $SW_1$ and $SW_2$. The transformer $T_1$ transfers energy from the input of the flyback converter 150 to its output and provides isolation between the input and output of the flyback converter 150. In operation, when the switch $SW_1$ is closed (the switch is turned "ON"), voltage source $V_{IN}$ is applied across the primary winding of the transformer $T_1$. As a result, a current in the primary winding and a magnetic flux in the transformer $T_1$ increases, which stores energy in the transformer $T_1$. When the switch $SW_1$ is then opened (the switch is turned "OFF"), the current in the primary winding and the magnetic flux drops. As a result, a current is induced in the secondary winding of the transformer $T_1$ that charges the capacitor $C_1$ with energy to generate an output voltage $V_O$ for powering a load.

The amount of energy transferred to the load can be controlled by adjusting the switching duty cycle of the switch $SW_1$ (e.g., by controlling peak input current), the switching frequency of the switch $SW_1$, or both. Controlling the duty cycle is referred herein to as peak current control, whereas, controlling the switching frequency is referred to herein as frequency control.

When the switch $SW_1$ is opened and the switch $SW_2$ is in the closed position (the switch $SW_2$ is "ON"), the current in the primary winding of the transformer $T_1$ can pass through the switch $SW_2$ to the snubber capacitor $C_{SN}$. Alternatively, when the switch $SW_1$ is opened and the switch $SW_2$ is in the open position (the switch $SW_2$ is "OFF"), the current in the primary winding of the transformer $T_1$ can pass through the body diode of the switch $SW_2$.

The high side switch $SW_2$ is preferably controlled such that it is open (OFF) when the low side switch $SW_1$ is closed (ON). Then, when the switch $SW_1$ is opened (OFF) and the energy from the transformer $T_1$ has been largely discharged to the output capacitor $C_1$, the voltage $V_\mathcal{L}$ will be equal to $V_{CSN}$. Under these conditions, the switch $SW_2$ is briefly closed (ON). The switch $SW_2$ is thus operated under zero volt switching (ZVS) conditions. Closing the switch $SW_2$ discharges the level of $V_\mathcal{L}$ to that of $V_{IN}$. Then, once $V_\mathcal{L}$ is substantially equal to $V_{IN}$, the switch $SW_2$ is opened (OFF). The voltage $V_\mathcal{L}$ continues to fall after the switch $SW_2$ is opened, such that when the switch $SW_1$ is closed, the voltage across it is zero or nearly zero. Thus, the switch $SW_1$ is also preferably operated under zero volt switching (ZVS) conditions. The cycle then repeats.

To summarize, during a switching cycle, the low side switch $SW_1$ is turned off; then the high side switch $SW_2$ is turned on and then off immediately before the low side switch $SW_1$ is turned on. The cycle is then repeated (i.e. $SW_1$—off, $SW_2$—on, $SW_2$—off, $SW_1$—on, $SW_1$—off, ... ). The high side switch $SW_2$ is thus turned on then off once before each low side switch $SW_1$ turn on. Also, the high side switch $SW_2$ is turned on then off once for each cycle of the low side switch $SW_1$ (while the low side switch $SW_1$ is off). In other words, each switch is turned on and then off while the other switch is off.

In an embodiment, both switches $SW_1$ and $SW_2$ are operated under ZVS, regardless of load. Thus, they are both operated under ZVS from no load to full load.

The flyback converter 150 has a resonant switching frequency. The resonant frequency is dependent upon physical characteristics of the flyback converter 150, including the inductance value of the transformer T1 primary winding and parasitic capacitance of the switches $SW_1$ and $SW_2$. When the switch $SW_2$ is closed, this introduces the capacitance of the snubber capacitor $C_{SN}$ and therefore effectively changes the resonant frequency of the flyback converter 150 while the switch $SW_2$ is closed.

The diode $D_1$ coupled to the transformer $T_1$ secondary winding operates as a freewheeling diode, allowing current in the secondary winding of the transformer $T_1$ to charge the capacitor $C_1$, and preventing discharge of the capacitor $C_1$ through the transformer $T_1$. The diode $D_1$ can be replaced with a switch that is operated synchronously with the switches $SW_1$ and $SW_2$ (synchronous rectification).

Figure 3:
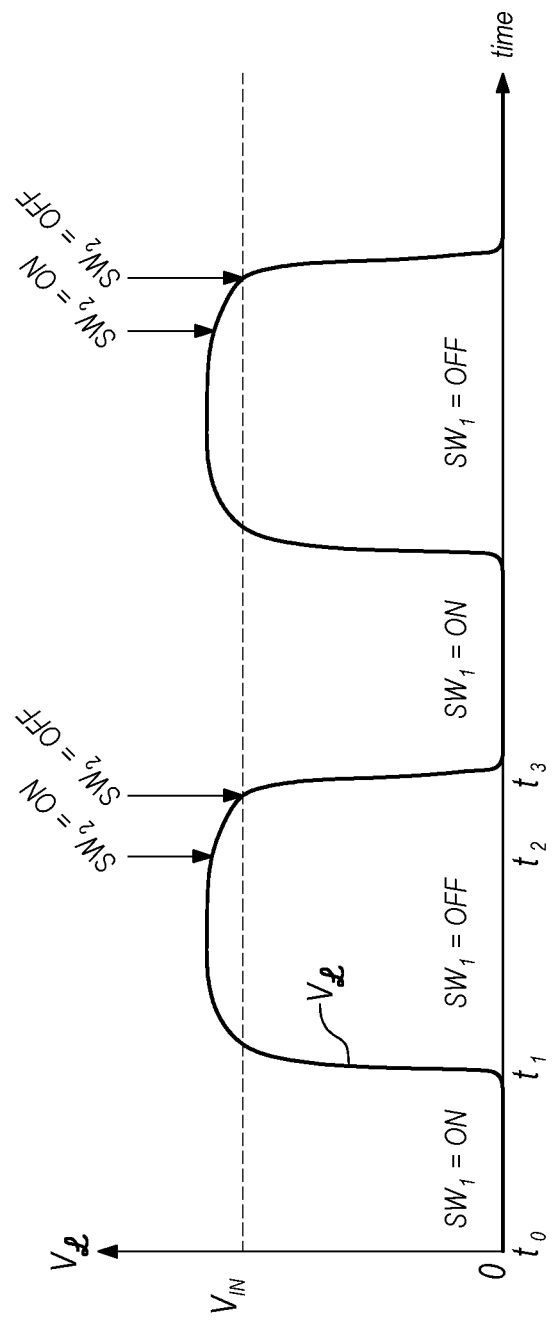
FIG. 3 illustrates a voltage waveform for a flyback converter in accordance with an embodiment of the present invention.

FIG. 3 shows a voltage waveform illustrating quasi-resonant operation of a flyback converter in accordance with an embodiment of the present invention. The waveform represents the level of $V_\mathcal{L}$ for two switching cycles. As shown in FIG. 3, the switch $SW_1$ is initially closed (ON) at time $t_0$ so that the level of $V_\mathcal{L}$ is essentially zero volts. This causes current to flow in the primary winding of the transformer $T_1$ which charges the primary winding of the transformer $T_1$ with energy. The switch $SW_1$ is then opened (OFF) at time $t_1$. As a result, the level of $V_\mathcal{L}$ rapidly rises to a level above that of $V_{IN}$. Current then passes through the body diode of the switch $SW_2$ while energy from the transformer $T_1$ induces a current in the secondary winding of the transformer $T_1$ which charges the output capacitor $C_1$. Then, when the voltage $V_\mathcal{L}$ is equal to $V_{CSN}$, or nearly equal to $V_{CSN}$, the switch $SW_2$ is briefly closed (ON) at time $t_2$. This discharges the level of $V_\mathcal{L}$ to that of $V_{IN}$. Then at time $t_3$ the switch $SW_2$ is opened (OFF) and the switch $SW_1$ is closed (ON). This causes the level of $V_\mathcal{L}$ to fall to zero volts while a current again flows in the primary winding of the transformer $T_1$ and the switching cycle repeats.

Because the voltage $V_\mathcal{L}$ is equal to or nearly equal to $V_{CSN}$ when the switch $SW_2$ is closed, the switch $SW_2$ is operated under zero volt switching (ZVS) conditions. The waveform shown in FIG. 3 assumes that the switch $SW_2$ is closed (ON) as soon as the voltage $V_\mathcal{L}$ first becomes equal to $V_{CSN}$, or nearly equal to $V_{CSN}$. This is referred to herein as "quasi-resonant" or "first hill" switching. If the closing of the switch $SW_2$ is delayed, the voltage $V_\mathcal{L}$ will tend to oscillate. Zero volt switching can be maintained under these conditions if the switch $SW_2$ is closed at a time when $V_\mathcal{L}$ is equal to or nearly equal to $V_{CSN}$ during oscillation of the voltage $V_\mathcal{L}$. This is referred to herein as "valley switching."

Figure 4:
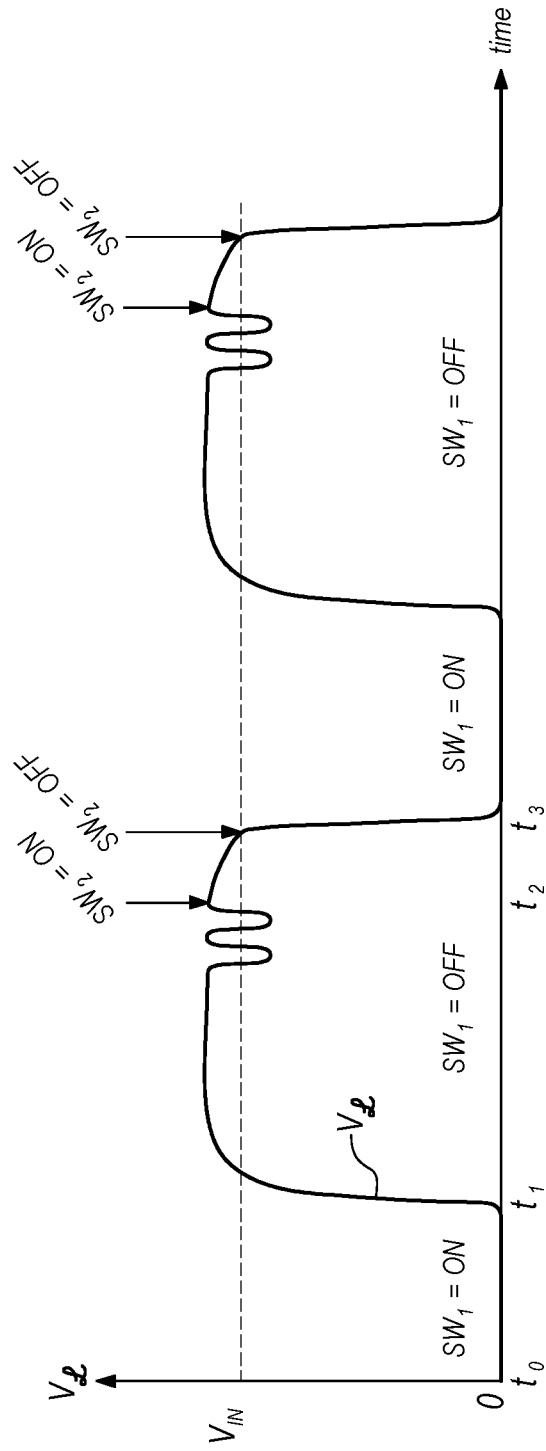
FIG. 4 illustrates a voltage waveform for a flyback converter in accordance with an embodiment of the present invention.

FIG. 4 shows a voltage waveform illustrating valley switching operation of a flyback converter in accordance with an embodiment of the present invention. The waveform of the voltage $V_\mathcal{L}$ shown in FIG. 4 is equivalent to that shown in FIG. 3 except that the voltage $V_\mathcal{L}$ oscillates prior to closing of the switch $SW_2$. FIG. 4 shows two oscillations occurring prior to the closing of switch $SW_2$ at time $t_2$. It will be apparent that greater or fewer oscillations can occur while maintaining zero volt switching so long as the switch $SW_2$ is closed at a time when $V_\mathcal{L}$ is equal to or nearly equal to $V_{CSN}$.

The flyback converter 150 can selectively operate in accordance with quasi-resonant switching (as in FIG. 3) or valley switching (as in FIG. 4), depending upon conditions such as switching frequency, loading conditions, component values, and so forth, in order to regulate the output voltage.

By controlling the high side switch $SW_2$ synchronously with ZVS, this provides for more efficient operation, for example, by avoiding losses caused by non-ZVS switching, and allows for operation at higher switching frequencies than otherwise which also tends to increase efficiency of the flyback converter.

Figure 5:
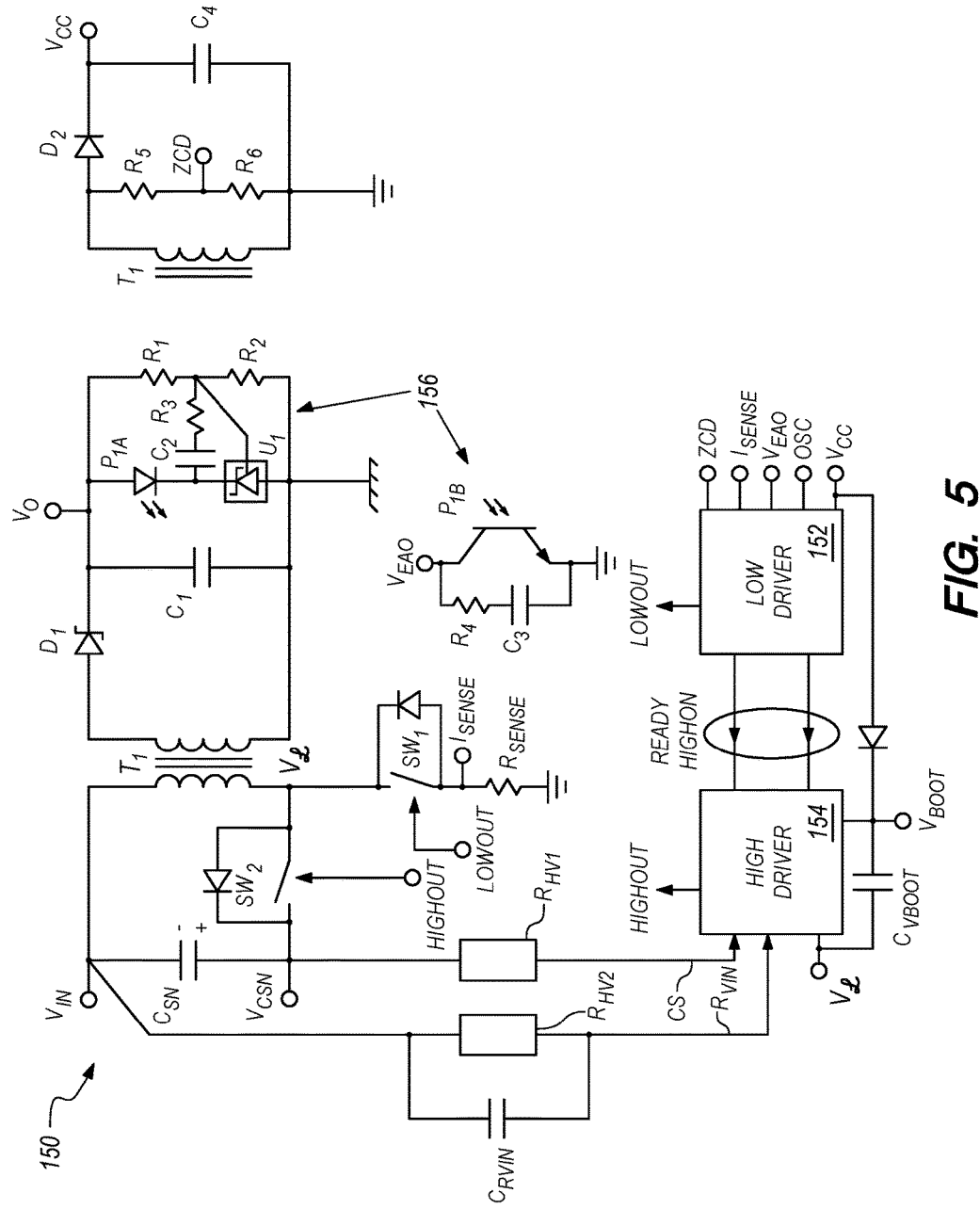
FIG. 5 illustrates a flyback converter and control circuitry in accordance with an embodiment of the present invention.

FIG. 5 illustrates a flyback converter 150 and control circuitry in accordance with an embodiment of the present invention. The flyback converter 150 of FIG. 2 is shown in FIG. 5 along with additional circuitry. In particular, a "low driver" controller 152 generates a signal LOWOUT that controls (opens and closes) the switch $SW_1$. The low driver controller 152 can control the switch $SW_1$ using frequency control and/or peak current control in a feedback loop so as to regulate the output voltage $V_O$. A "high driver" controller 154 generates a signal HIGHOUT that controls (opens and closes) the switch $SW_2$.

As shown in FIG. 5, a resistive divider and photo-couple network 156 is coupled to the flyback converter 150 output and includes resistors $R_1$, $R_2$, and $R_3$, capacitor $C_2$, photo-diode $P_{1A}$, and shunt regulator $U_1$. The photo-diode $P_{1A}$ is optically coupled to phototransistor $P_{1B}$. The phototransistor $P_{1B}$ is coupled to a compensation resistor $R_4$ and capacitor $C_3$. A voltage signal $V_{EAO}$ is generated across the compensation resistor $R_4$ and capacitor $C_3$. The signal $V_{EAO}$ is representative of an error signal (a difference between the level of $V_O$ and a desired level for $V_O$) and is also representative of a level of input power to the flyback converter 150. The signal $V_{EAO}$ is electrically isolated from the output voltage $V_O$ and is instead referenced to the ground level of the primary side of the transformer $T_1$.

The transformer $T_1$ can include a second secondary winding. As shown in FIG. 5, a first terminal of the second secondary winding of the transformer $T_1$ is coupled to an anode of a diode $D_2$. A cathode of the diode $D_2$ is coupled to a first terminal of a capacitor $C_4$. A second terminal of the second secondary winding of the transformer $T_1$ is coupled to a second terminal of the capacitor $C_4$ and to the first ground node. A voltage $V_{CC}$ is formed across the capacitor $C_4$ and can be used for powering control circuitry of the flyback converter 150. A resistive divider includes resistors $R_5$ and $R_6$ and generates a voltage signal ZCD that is representative of the level of $V_{CC}$. The signal ZCD is also representative of the level of $V_\mathcal{L}$.

As also shown in FIG. 5, a current sensing resistor $R_{SENSE}$ is coupled between the second terminal of the transistor switch $SW_1$ and the first ground node. A current sensing signal $I_{SENSE}$ is formed across the resistor $R_{SENSE}$.

The low driver controller 152 receives as inputs the signals ZCD, $I_{SENSE}$, $V_{EAO}$ as well as an oscillator signal OSC and uses these signals to generate the signal LOWOUT for controlling the transistor switch $SW_1$ as explained herein. Briefly, the signal $V_{EAO}$ represents the load power and is used to regulate the output voltage in a feedback loop based on either peak current control or switching frequency control. The signal $I_{SENSE}$ represents the current in the transformer $T_1$ and is used to the control peak current in the transformer primary winding during switching. The oscillator signal OSC is used for controlling the timing of switching. The signal ZCD is representative of the level of $V_\mathcal{L}$ and is used to turn on the switch $SW_1$.

The low driver controller 152 generates a differential signal READYHIGHON which is used by the high driver controller 154 for controlling the transistor switch $SW_2$ as explained herein. Briefly, the signal READYHIGHON informs the high driver controller 154 that it can (i.e. has permission to) turn on the switch $SW_2$, though the high driver controller 154 determines the timing of turning on the switch $SW_2$. The signal READYHIGHON is preferably a differential signal because the low driver controller 152 and the high driver controller 154 have different ground reference nodes. In particular, the low driver controller 152 is referenced to the first ground node, whereas, the high driver controller 154 preferably uses the voltage $V_\mathcal{L}$ as its reference.

As also shown in FIG. 5, a first terminal of a first high-voltage resistor $R_{HV1}$ is coupled to the second terminal of the capacitor $C_{SN}$. A second terminal of the resistor $R_{HV1}$ is coupled to the high driver controller 154. This provides the high driver controller 154 with a signal CS that is representative of the voltage $V_{CSN}$. A first terminal of a second high-voltage resistor $R_{HV2}$ is coupled to the input voltage $V_{IN}$. A second terminal of the resistor $R_{HV2}$ is coupled to the high driver controller 154. A capacitor $C_{RVIN}$ is preferably coupled in parallel with the resistor $R_{HV2}$. This provides the high driver controller 154 with a signal $R_{VIN}$ that is representative of the voltage $V_{IN}$. The capacitor $C_{RVIN}$ helps in smoothing the signal RVIN particularly at light loads. The voltage $V_\mathcal{L}$ signal is also coupled to the high driver controller 154. The high driver controller 154 uses the signals $R_{VIN}$, CS, $V_\mathcal{L}$, and READYHIGHOUT to generate the signal HIGHOUT that controls (opens and closes) the switch $SW_2$ as explained herein. Briefly, when $V_\mathcal{L}$ is greater than $V_{IN}$ and CS is substantially equal to $V_\mathcal{L}$, the high driver controller 154 turns on the switch $SW_2$. The switch $SW_2$ stays on until $V_\mathcal{L}$ is substantially equal to $V_{IN}$ and then the switch $SW_2$ is turned off.

Also shown in FIG. 5, the voltage $V_{CC}$ can be used as a power supply for powering elements of the low driver controller 152. A voltage $V_{BOOT}$ can be used as a power supply for powering elements of the high driver controller 154. The voltage $V_{BOOT}$ can be obtained by drawing current from $V_{CC}$, for example, via a diode which then charges a capacitor $C_{VBOOT}$.

A switching cycle is performed as follows. The low side switch $SW_1$ is turned on. Then, once the peak current in the primary winding of the transformer $T_1$ is reached, as indicated by the current sensing signal $I_{SENSE}$, the low side switch $SW_1$ is turned off. The peak current depends on the level of $V_{EAO}$: (1) when $V_{EAO}$ is less than a threshold (e.g. 2.5 volts), then the flyback converter is in frequency control mode and the peak current is essentially a fixed value (though the peak current is preferably gradually reduced as VEAO falls in order to increase efficiency and inhibit audible noise in burst mode); (2) when $V_{EAO}$ is greater than the threshold (e.g. 2.5 volts), then the flyback converter is in current control mode and the peak current depends on $V_{EAO}$ (and the switching frequency is clamped). Once the low side switch $SW_1$ turns off, the voltage $V_\mathcal{L}$ flys up, eventually reaching a level above the input voltage $V_{IN}$. The low side driver 152 then activates sending the READYHIGHON signal to the high side driver 154. The READYHIGHON signal is activated at a time that depends upon the switching frequency. After receiving the READYHIGHON signal, the high side driver 154 determines that $V_\mathcal{L}$ is greater than $V_{IN}$ and, in response to this determination, the high side driver 154 turns on the high side switch $SW_2$. The high side switch $SW_2$ remains on until the level of $V_\mathcal{L}$ falls to the level of $V_{IN}$, as which time, high side driver 154 turns off the high side switch $SW_2$. When the level of $V_\mathcal{L}$ falls to zero, the low side switch $SW_1$ can be turned on again.

The waveforms of FIGS. 3 and 4 apply equally to the current control and frequency control modes, though the time scale will change, dependent upon the mode of operation.

Figure 6:
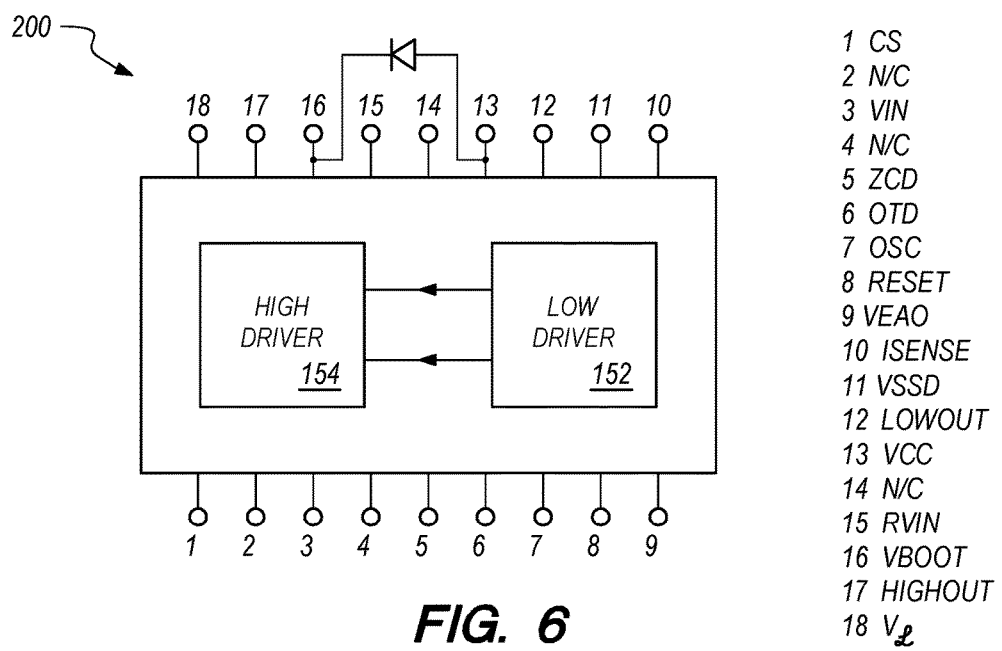
FIG. 6 illustrates a controller integrated circuit for a DC-to-DC converter in accordance with an embodiment the present invention.

FIG. 6 illustrates an integrated circuit (IC) controller for a DC-to-DC converter in accordance with an embodiment the present invention. In a preferred embodiment, the IC controller is implemented as an IC package 200 that includes the low driver controller 152 as a first monolithic IC chip and the high driver 154 as a second monolithic IC chip, both included in the same 18-pin IC package. In an embodiment, the switch $SW_2$ is integrated into the high driver controller 152 IC chip. Also, in an embodiment, the resistors $R_{HV1}$ and $R_{HV2}$ is included in the IC package. One or both of the resistors $R_{HV1}$ and $R_{HV2}$ can be integrated into the high driver controller 152 IC chip. Further, the resistor $R_{HV2}$ can be partially integrated into the high driver controller 152 IC chip. As explained herein, each of the two IC chips has a different ground reference. Communication between the two chips is via the differential signal READYHIGHON.

FIG. 6 shows signals assigned to each of the 18 pins:
Pin 1 CS
Pin 2 N/C
Pin 3 $V_{IN}$
Pin 4 N/C
Pin 5 ZCD
Pin 6 OTP
Pin 7 OCS
Pin 8 RESET
Pin 9 $V_{EAO}$ Pin 10 $I_{SENSE}$
Pin 11 $V_{SSD}$
Pin 12 LOWOUT
Pin 13 $V_{CC}$
Pin 14 N/C
Pin 15 $R_{VIN}$
Pin 16 $V_{BOOT}$
Pin 17 HIGHOUT
Pin 18 $V_{\mathcal{L}}$ Pin 2, pin 4, and pin 14 are not used and are labeled "N/C" or "no connection." A diode is connected between pin 13 and pin 16. OTP can be an over-temperature protection pin that provides a current to an external thermistor, the voltage on which can then be compared to a reference, such as 1.0 volt, to detect an over-temperature condition. $V_{SSD}$ is a ground pin. A reset pin RESET can be used to reset the ICs of the package after entering a protection mode. The reset can be accomplished by pulling the RESET pin to a voltage that is less than a reference voltage such as 2.5 volts.

Figure 7:
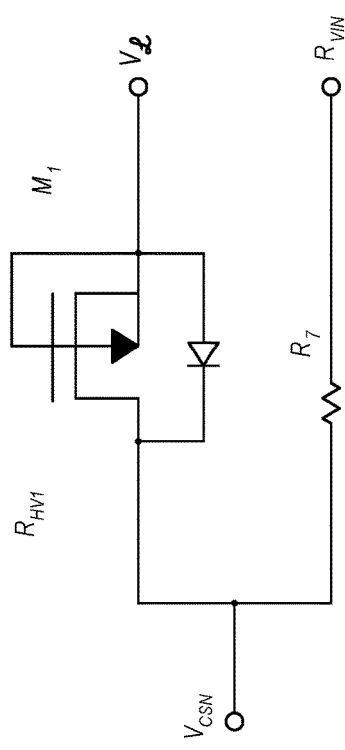
FIG. 7 illustrates a high-voltage resistor in accordance with an embodiment of the present invention.

FIG. 7 illustrates a high-voltage resistor $R_{HV1}$ in accordance with an embodiment of the present invention. A first terminal of the high-voltage resistor $R_{HV1}$ is coupled to receive the signal $V_{CSN}$. Within the high-voltage resistor $R_{HV1}$ the first terminal is coupled to a first terminal of a MOSFET $M_1$ and to a first terminal of a resistor $R_7$. A second terminal of the MOSFET $M_1$ is coupled to the signal $V_{\mathcal{L}}$. A second terminal of the resistor $R_7$ is coupled to the signal $R_{VIN}$ that is representative of the voltage $V_{IN}$. The resistor $R_7$ can be, for example, 10 Megaohms. The resistor $R_{HV1}$ can be integrated into the high driver controller 152 IC chip or can be included in a separate chip within the IC package.

Figure 8:
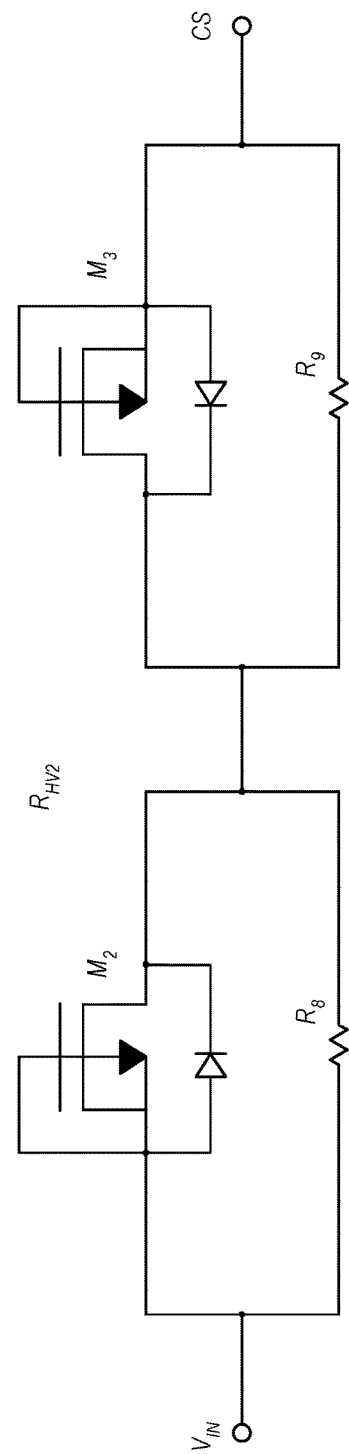
FIG. 8 illustrates a two-way, high-voltage resistor in accordance with an embodiment of the present invention.

FIG. 8 illustrates a two-way, high-voltage resistor $R_{HV2}$ in accordance with an embodiment of the present invention. A first terminal of the high-voltage resistor $R_{HV2}$ is coupled to the input voltage $V_{IN}$. Within the high-voltage resistor $R_{HV2}$ the first terminal is coupled to a first terminal of a MOSFET $M_2$ and to a first terminal of a resistor $R_8$. A second terminal of the MOSFET $M_2$ is coupled a second terminal of the resistor $R_8$, to a first terminal of a MOSFET $M_3$ and to a first terminal of a resistor $R_9$. A second terminal of the MOSFET $M_3$ is coupled to a second terminal of the resistor $R_9$ and to the signal CS. The resistors $R_8$ and $R_9$ can each be, for example, 10 Megaohms. The resistor $R_{HV2}$ can be fully or partially integrated into the high driver controller 152 IC chip. If partially integrated, the MOSFET $M_2$ and the resistor $R_8$ can be integrated, while the MOSFET $M_3$ and the resistor $R_9$ can be included in a separate chip within the IC package. Alternatively, the MOSFET $M_3$ and the resistor $R_9$ can be integrated, while the MOSFET $M_2$ and the resistor $R_8$ can be included in a separate chip within the IC package. Alternatively, MOSFET $M_3$ and the resistor $R_9$ can be included a first separate chip within the IC package, while the MOSFET $M_2$ and the resistor $R_8$ can be included in a second separate chip within the IC package.

Figure 9:
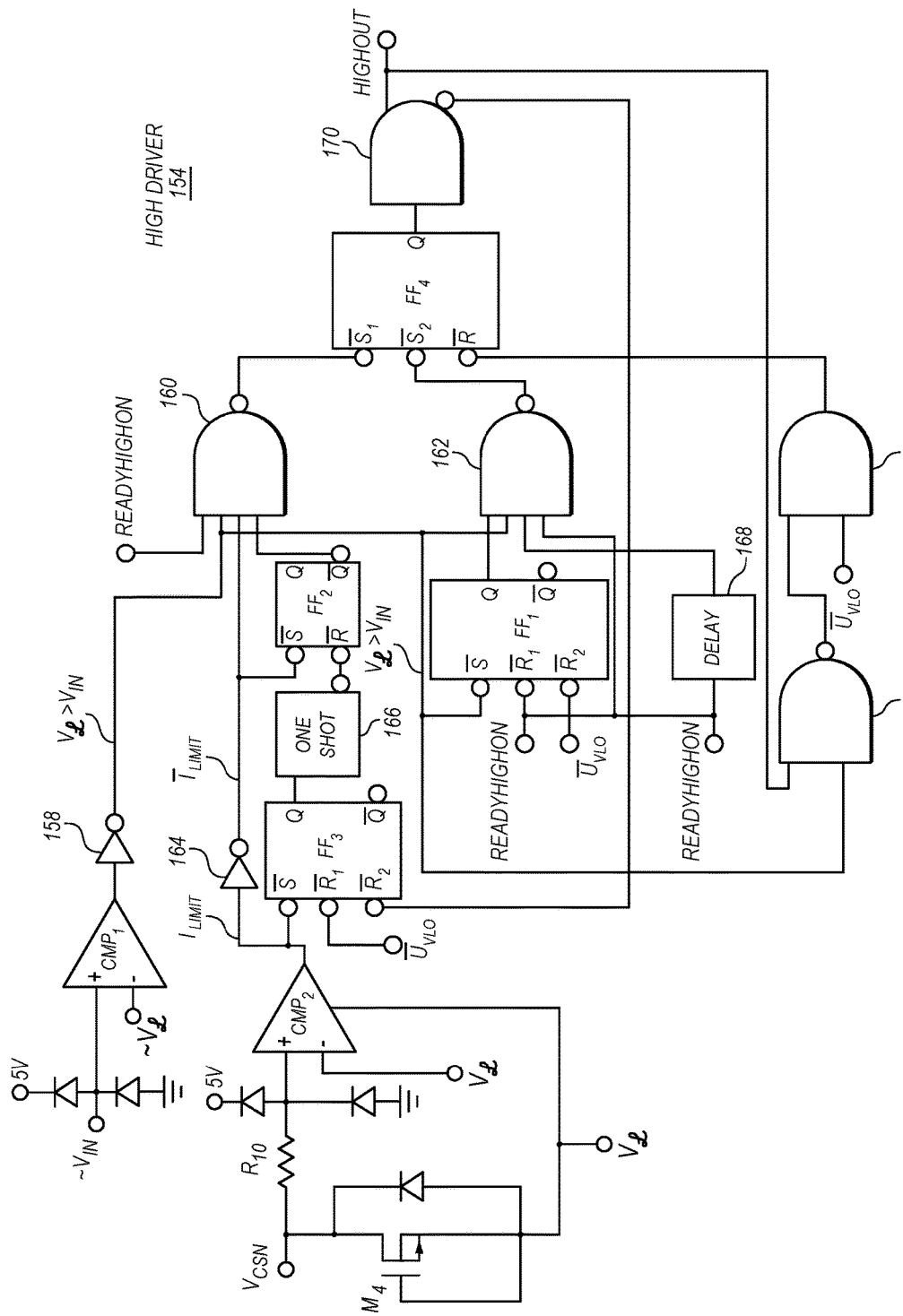
FIG. 9 illustrates control circuitry for a flyback converter in accordance with an embodiment of the present invention.

FIG. 9 illustrates control circuitry of the high driver 154 in accordance with an embodiment of the present invention. A signal $R_{VIN}$, which approximates the signal $V_{IN}$, is compared by a comparator $CMP_1$ to the signal $V_{\mathcal{L}}$. An output of the comparator $CMP_1$ is inverted by an inverter 158 to form a logic signal $V_{\mathcal{L}} > V_{IN}$. The signal $V_{\mathcal{L}} > V_{IN}$ is coupled to an input of a NAND gate 160, to an inverted set input S-bar of a flip-flop $FF_1$, to an input of a NAND gate 161 and to an input of a NAND gate 162.

The signals at the input of the comparator $CMP_1$ are shown as approximately equal $V_{IN}$ and $V_{\mathcal{L}}$. These input signal levels may be adjusted (e.g. by a current source adding or removing current from each comparator input node) in order to compensate for signal path delays during high-frequency operation and to limit their amplitudes (e.g., by diode clamping).

The signal $V_{CSN}$ is coupled to a first terminal of a resistor $R_{10}$ and to a first terminal of a MOSFET $M_4$. The signal $V_{CSN}$ may also be amplitude limited by diode clamping. A second terminal of the resistor $R_{10}$ is coupled to a first input terminal of a comparator $CMP_2$. A second terminal of the MOSFET $M_4$ is coupled to the signal $V_{\mathcal{L}}$ and to a reference node of the comparator $CMP_2$. The signal $V_{\mathcal{L}}$ is coupled to a second input terminal of the comparator $CMP_2$. The comparator $CMP_2$ compares the signal $V_{CSN}$ to the signal $V_{\mathcal{L}}$ to form a current-limit signal $I_{LIMIT}$. The signal $I_{LIMIT}$ is provided via an inverter 164 to an input of the NAND gate 160 and to an inverted set input S-bar of a flip-flop $FF_2$. The signal $I_{LIMIT}$ indicates that the level of $V_{CSN}$ is equal to $V_{\mathcal{L}}$ and that the switch $SW_2$ can be opened.

The signal $I_{LIMIT}$ is coupled to an inverted set input S-bar to a flip-flop $FF_3$. An output Q of the flip-flip $FF_3$ is coupled to an input of a one-shot circuit 166. An inverted output of the one-shot circuit 166 is coupled to an inverted reset input R-bar to the flip-flip $FF_2$. An inverted output Q-bar of the flip-flop $FF_2$ is coupled to an input of the NAND gate 160.

The signal READYHIGHON is coupled to an input of the NAND gate 160, to a first inverted reset input $R_1$-bar to the flip-flop $FF_1$, to an input of a delay 168 and to an input of the NAND gate 162. An inverted under-voltage lockout signal $U_{VLO}$-bar is coupled to a first inverted reset input $R_1$-bar to the flip-flop $FF_3$ and to second inverted reset input $R_s$-bar to the flip-flop $FF_1$. An output Q of the flip-flop $FF_1$ is coupled to an input of the NAND gate 162. An output of the delay 168 is coupled to an input of the NAND gate 162.

An output of the NAND gate 160 is coupled to a first inverted set input $S_1$-bar of a flip-flop $FF_4$. An output of the NAND gate 162 is coupled to a second inverted set input $S_2$-bar of the flip-flop $FF_4$. An output Q of the flip-flop $FF_4$ is coupled to an input of a gate 170. An output of the gate 170 is coupled to a second reset input to the flip-flop $FF_3$. A non-inverted output of the gate 170 forms the signal HIGHOUT. The non-inverted output of the gate is coupled to a second input of the NAND gate 161. An output of the NAND gate 161 is coupled to a first input of a NAND gate 171. The inverted under-voltage lockout signal $U_{VLO}$-bar is coupled to a second input of the NAND gate 171. An output of the NAND gate 171 is coupled to an inverted reset input R-bar to the flip-flop $FF_4$.

Elements of FIG. 9 detect occurrence of the "first hill" for performing quasi-resonant switching as shown in FIG. 3. The signal READYHIGHON informs the high driver controller 154 that it can (i.e. has permission to) turn on the switch $SW_2$. The high driver controller 154 then determines the timing of turning on the switch $SW_2$: when $V_{\mathcal{L}}$ is greater than $V_{IN}$ (as indicated by the signal $V_{\mathcal{L}} > V_{IN}$) the high driver controller 154 turns on the switch $SW_2$.

The flip-flop $FF_1$ and the delay block 168 are used to delay turning on the switch $SW_2$ so as to avoid turning on the switch prematurely. The $U_{VLO}$ signal inhibits switching in case of an under-voltage condition.

The switch $SW_2$ stays on until $V_{\mathcal{L}}$ is substantially equal to $V_{IN}$ and then the switch $SW_2$ is turned off. This is determined when $V_{CSN}$ is substantially equal to $V_{\mathcal{L}}$, as indicated by the signal $I_{LIMIT}$. The generated signal HIGHOUT is used to control the switch $SW_2$.

Figure 10:
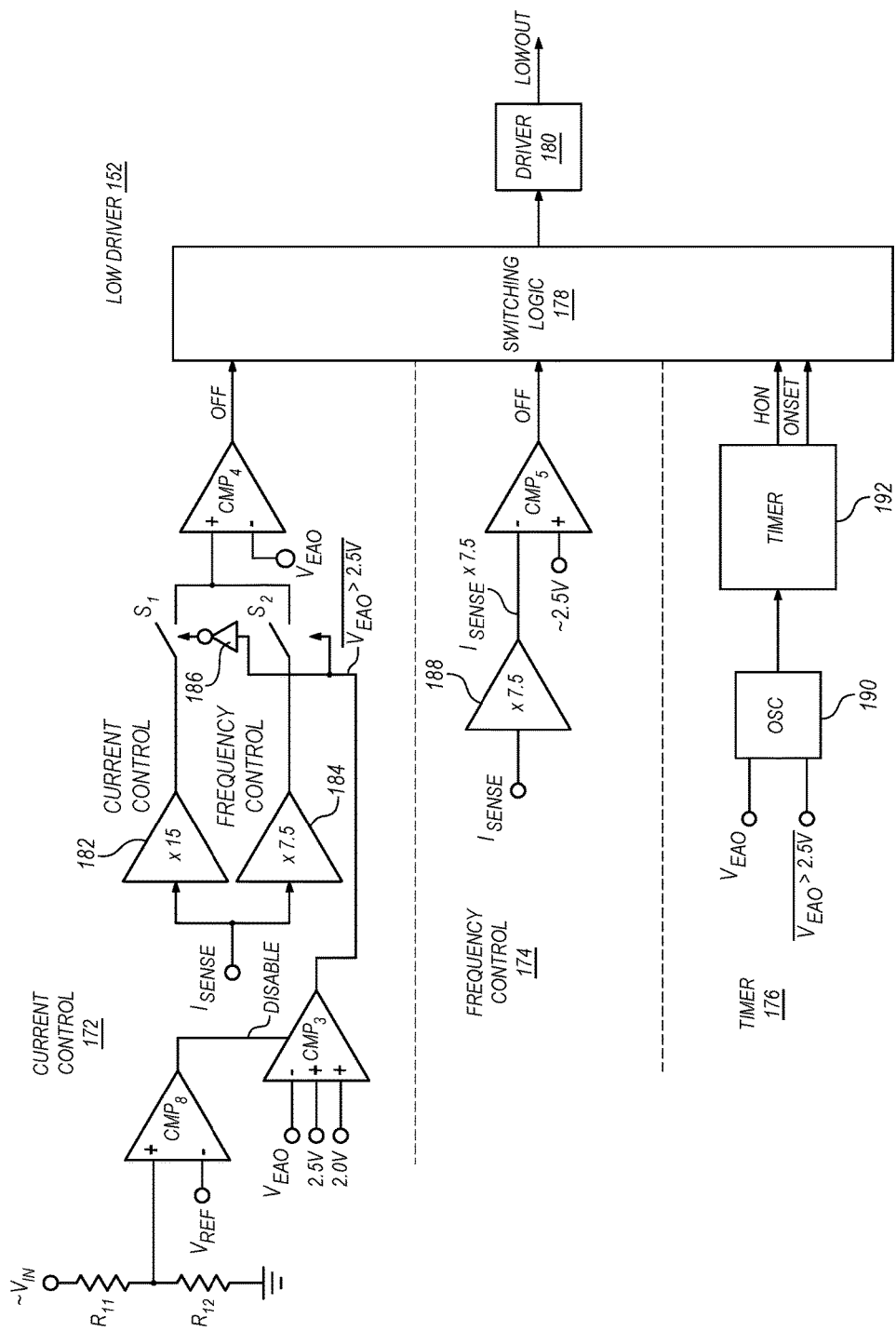
FIG. 10 illustrates additional control circuitry for a flyback converter in accordance with an embodiment of the present invention.

FIG. 10 illustrates control circuitry of the low driver 152 in accordance with an embodiment of the present invention. As shown in FIG. 10, the low driver 152 includes a current control section 172, a frequency control section 174, a timer section 176, switching logic 178 and a switch driver 180.

Within the current control section 172 of the low driver 152, the signal $V_{EAO}$ is coupled to a first input to a comparator $CMP_3$. A second input to the comparator $CMP_3$ receives a first reference voltage (e.g. 2.5 volts) while a third input to the comparator $CMP_3$ receives a second reference voltage (e.g. 2.0 volts). The comparator $CMP_3$ generates a signal "$V_{EAO}$>2.5 v-bar" by comparing the signal $V_{EAO}$ to the first and second reference voltages; the signal "$V_{EAO}$>2.5 v-bar" is activated when $V_{EAO}$ rises above the first reference and is deactivated when the signal $V_{EAO}$ falls below the second reference. Thus, the comparator $CMP_3$ performs its comparison with hysteresis. The comparator $CMP_3$ determines whether low driver controller 154 performs switching based on peak current control or based on frequency control. When $V_{EAO}$ rises above 2.5 volts, switching is by peak current control; when $V_{EAO}$ falls below 2.0 volts, switching is by frequency control. Thus, the logic level of "$V_{EAO}$>2.5 v-bar" determines whether the switching is based on peak current control or frequency control.

The signal $I_{SENSE}$ is coupled an input to a first amplifier 182 and to an input to a second amplifier 184. The amplifier 182 can have, for example, a gain of 15, while the amplifier 184 can have a gain of, for example 7.5. The output of the amplifier 182 is coupled to a first input to a comparator $CMP_4$ via a switch $S_1$. The output of the amplifier 184 is coupled to the first input of the comparator via a switch $S_2$. The signal $V_{EAO}$ is coupled to a second input to the comparator CMP4. The signal "VEAO>2.5 v-bar" is coupled to control the switch $S_2$ and to control the switch $S_1$ via an inverter 186. Thus, one of the switches $S_1$ are $S_2$ is closed while the other is opened dependent upon the signal "$V_{EAO}$>2.5 v-bar". Accordingly, the outputs of the amplifiers 182 and 184 are selectively coupled to the first input of a comparator $CMP_4$ dependent upon the level of $V_{EAO}$. An output of the comparator CMP4 is coupled to an input to switching logic 178.

Under current control, the amplifier 182 having higher gain is active so as to magnify the effect of $I_{SENSE}$ in comparison to VEAO by comparator $CMP_4$. Under frequency control, the amplifier 184 is active which employs lower gain so as to reduce the effect of $I_{SENSE}$ in the comparison which causes the frequency control section 174 to primarily control switching.

Within the frequency control section 174 of the low driver 152, the signal $I_{SENSE}$ is coupled to an input to an amplifier 188. The amplifier 188 can have, for example, a gain of 7.5. An output of the amplifier 188 is coupled to a first input to a comparator CMP5. A second input to the comparator is coupled to a reference voltage, which can be, for example, approximately 2.5 volts. An output of the comparator CMP5 is coupled to an input to switching logic 178.

The current control section 172 and the frequency control section 174 control the timing of turning off the low side switch $SW_1$ within each switching cycle via switching logic 178.

The timer section 176 of the low driver 152 controls switching frequency as well as the timing for turning on the low side switch $SW_1$ for each switching cycle. Within the timer section 176, the signal $V_{EAO}$ is coupled to a first input to an oscillator 190. The signal "$V_{EAO}$>2.5 v-bar" from the comparator $CMP_3$ is coupled to a second input of the oscillator 190. The oscillator 190 generates a periodic ramp signal that is coupled to an input of timer block 192.

The timer block 192 generates a logic signal HON and a logic signal ONSET which are coupled to the switching logic 178. The signal HON is used to generate the signal READYHIGHON for the high driver controller 154. For peak current control, the signal HON is generated at fixed intervals. The signal ONSET is used to turn on the low side switch $SW_1$. For example, a timer of 3.33 microseconds can be reset for each switching cycle; 500 nanoseconds prior to expiration of the timer, the signal HON is activated. And, upon expiration of the timer, and once ZCD is greater than zero, then the signal ONSET can be activated. Once ONSET is activated, then the low side switch $SW_1$ can be closed upon a valley in signal ZCD (since ZCD represents $V_\mathcal{L}$) so as to operate the switch $SW_1$ under zero volt switching (ZVS) conditions. The 500 nanosecond difference ensures that HON is activated prior to ONSET.

The signal ZCD is referenced to the same ground level as the low side driver controller 152. The signal ZCD is also representative of the level of $V_\mathcal{L}$. Thus, signal ZCD is used by the low side driver controller 152 as a proxy for $V_\mathcal{L}$ in order to operate the switch $SW_1$ under ZVS conditions.

For current control, rather than a fixed timer interval of 3.33 microseconds, for example, the timer interval is varied dependent upon the level of $V_{EAO}$. Thus, the timer interval affects the switching frequency for regulating the output voltage in a feedback loop.

The timer interval of 3.33 microseconds corresponds to a switching frequency for peak current control of 300 kHz. In an embodiment, the switching frequency $f_{clamp}$ can be clamped at 500 kHz, 300 kHz, 145 kHz, or some other selected frequency by appropriate selection of timing components.

An output of the switching logic 178 is coupled to a driver 180. The driver 180 generates the signal LOWOUT.

During a switching cycle of the switches $SW_1$ and $SW_2$, the level of $V_\mathcal{L}$ rises above the level of $V_{IN}$ immediately upon opening of the low side switch $SW_1$. Under light load conditions, energy stored in the primary side of the transformer $T_1$ is not as effectively transferred to its secondary side. The energy stored in the snubber capacitor $C_{SN}$ can therefore increase with each switching cycle so that it becomes overcharged with energy and so that the level of $V_\mathcal{L}$ can ring to an excessively high level upon opening of the low side switch $SW_1$. These effects of a light load condition can be mitigated by turning on the high side switch $SW_2$ earlier in the switching cycle. Thus, in accordance with an embodiment of the present invention, the high side switch $SW_2$ is turned on earlier in the switching cycle under certain light load conditions than it would otherwise be turned on. Similarly, when the input supply voltage $V_{IN}$ is at a high level, this can also result in overcharging the snubber capacitor $C_{SN}$. This can also be mitigated by turning on the high side switch $SW_2$ earlier in the switching cycle. Using frequency control to control switching when the input voltage $V_{IN}$ is at a high level, rather than current control, can also help to mitigate these issues. Thus, in accordance with an embodiment of the present invention, frequency control is used under certain high input voltage conditions.

In an embodiment, a comparator $CMP_8$ is included in the current control section 172 of FIG. 10 which compares the level of the signal $R_{VIN}$ (which is representative of the voltage $V_{IN}$) to a reference. As shown in FIG. 10, the signal $R_{VIN}$ can be stepped down by a voltage divider that includes resistors $R_{11}$ and $R_{12}$. The stepped down voltage is compared to a reference voltage Vref. When this comparison indicates that the level of $V_{IN}$ is greater than a threshold (e.g., 226 volts DC), then the output of the comparator $CMP_8$ disables the comparator $CMP_3$. As a result, the switch $S_1$ is open and the switch $S_2$ is closed so that the amplifier

184 is active. This causes the frequency control section 174 of the flyback converter control circuitry to primarily control switching, rather than the current control section 172. Thus, the controller of the flyback converter operates in the frequency control mode upon detection of a supply voltage condition (e.g. when $V_{IN}$ is greater than the threshold of 226 volts DC).

Figure 15:
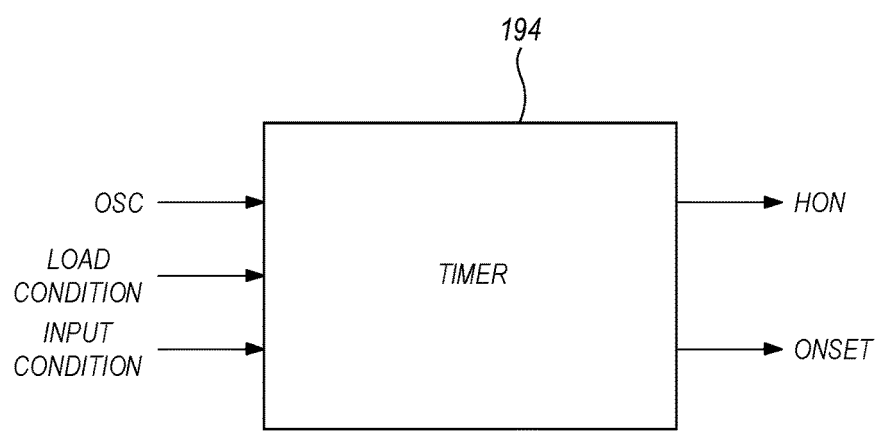
FIG. 15 illustrates an alternative embodiment of a timer in accordance with an embodiment of the present invention.

In addition, the timer 192 of FIG. 10 can be replaced with timer 194 of FIG. 15. FIG. 15 illustrates an alternative embodiment of the timer 192 of FIG. 10. As shown in FIG. 15, the timer 194 accepts as input a "Load Condition" signal and an "Input Condition" signal, in addition to the oscillator signal OSC described herein. The timer 194 uses these signals to generate the signals HON and ONSET described herein. The Load Condition and Input Condition signals are binary (i.e. each having two possible states such as true/false or zero/one) and indicate when the current loading is light and when the input voltage $V_{IN}$ is high, respectively. Because the signal $V_{EAO}$ is indicative of loading, the Load Condition signal can be equivalent to the logic signal "$V_{EAO}$>2.5 v-bar". The Input Condition signal can be equivalent to the output of the comparator $CMP_8$ since it is indicative of the input voltage $V_{IN}$ exceeding a threshold (e.g. 226 volts DC).

Similarly to the timer 192 of FIG. 10, the timer 194 of FIG. 15, generates a logic signal HON and a logic signal ONSET, which are coupled to the switching logic 178. The signal HON is used to generate the signal READYHIGHON for the high driver controller 154. For frequency control, the signals HON and ONSET are generated at intervals that depend on the switching frequency as determined by the frequency of the oscillator signal OSC. For example, a timer having a variable time duration can be reset for each switching cycle. This time duration will change dependent upon the switch frequency. The time duration for a particular frequency can be, for example, 3.33 microseconds. At an instant prior to expiration of the timer, the signal HON is activated. The amount of time prior to expiration of the timer that the activation of HON occurs is also dependent upon the switching frequency but can also be dependent upon the levels of Load Condition and Input Condition signals in order to turn on the high side switch $SW_2$ earlier in the switching cycle. For example, when the switching frequency results in the timer duration being 3.33 microseconds, the activation can occur 500 nanoseconds prior to expiration of the timer under normal conditions. However, if one or both of the Load Condition and Input Condition signals indicates a light load condition or a high input voltage condition, then the time duration may be adjusted (e.g. increased to 1000 nanoseconds or 1.0 microsecond) in order to activate the signal HON earlier in the switching cycle and therefore to also turn on the switch $SW_2$ earlier in the switching cycle.

Figure 16:
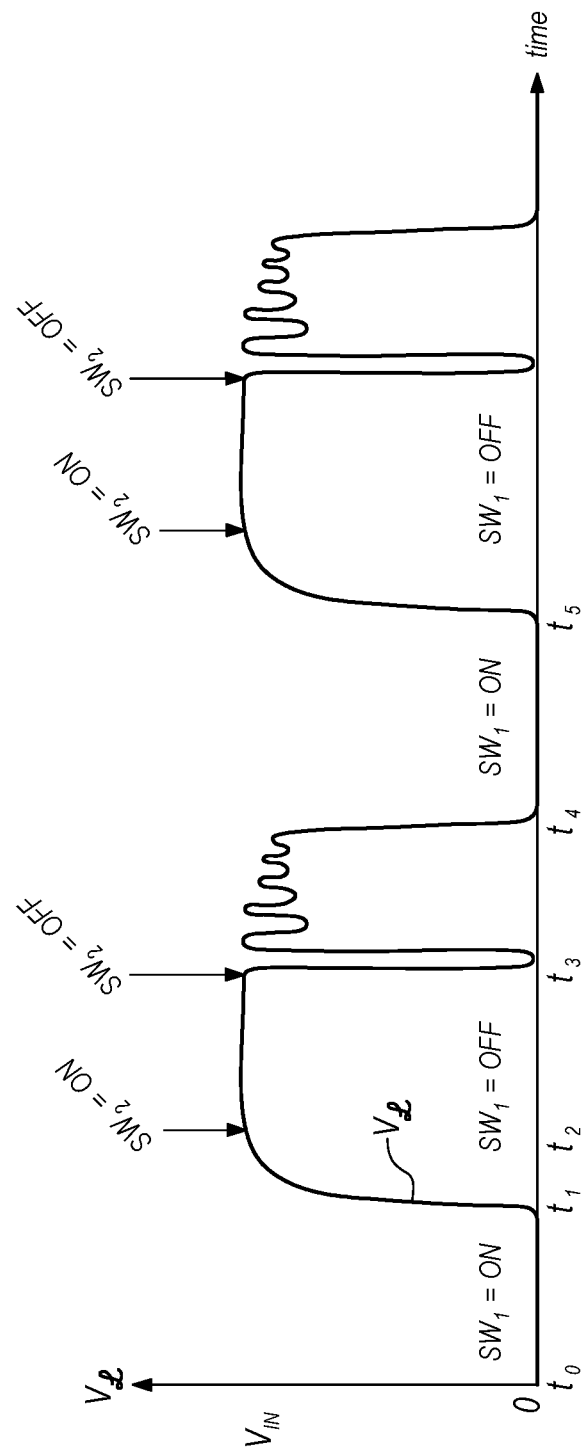
FIG. 16 illustrates a voltage waveform for a flyback converter in accordance with an alternative embodiment of the present invention in which the high side driver is closed earlier in the switching cycle than in FIGS. 3 and 4.

Thus, as shown in FIG. 16, the interval $t_2$-$t_3$ during which the high side switch $SW_2$ is closed can be moved to a position that is earlier in the switching cycle in comparison to FIGS. 3 and 4. More particularly, FIG. 16 illustrates a voltage waveform for a flyback converter in accordance with an alternative embodiment of the present invention similar to FIGS. 3 and 4; however, as shown in FIG. 16, the high side driver $SW_2$ is closed earlier in the switching cycle. As shown in FIG. 16, at a time $t_0$, the switch $SW_1$ is closed (turned "ON"). Then, at a time $t_1$, the switch $SW_1$ is opened (turned "OFF") which causes the voltage Veto rise. At a time $t_2$, the switch $SW_2$ is closed (turned "ON"). The time at which the switch $SW_2$ is closed can be determined in part by the "Load Condition" and "Input Condition" signals, as described herein. Then, at a time $t_3$, the switch $SW_2$ is opened (turned "OFF"). The switch $SW_2$ is opened when the level of $V_R$ falls to the level of $V_{IN}$. This causes the voltage $V_R$ to fall to the ground level (or nearly so) before rising again and oscillating in accordance with the resonant frequency of the primary side of the converter. Then, at a time $t_4$, the low side switch $SW_1$ is closed which causes the level of Veto fall again. The cycle repeats with the low side switch $SW_1$ being opened again at the time $t_5$.

Thus, in accordance with the embodiment illustrated in FIG. 16, the controller of the flyback power converter is configured to adjust a time instant of closing the high side switch $SW_2$ within each switching cycle upon detection of a one or more of a load condition or a supply voltage condition. Under these conditions, the high side switch $SW_2$ is closed after the high side driver 154 is given permission to close the switch $SW_2$ via the signal HON and preferably when the level of the voltage $V_R$ is equal to $V_{CSN}$, or nearly equal to $V_{CSN}$. Thus, the switch $SW_2$ is still operated under ZVS even under light load conditions. However, as shown in FIG. 16, the low side switch $SW_1$ may be closed (at the time $t_4$) without the level of $V_R$ falling to zero; thus, the low side switch $SW_1$ may no longer be operated in accordance with ZVS. However, this is acceptable particularly when the load condition is light.

Figure 11:
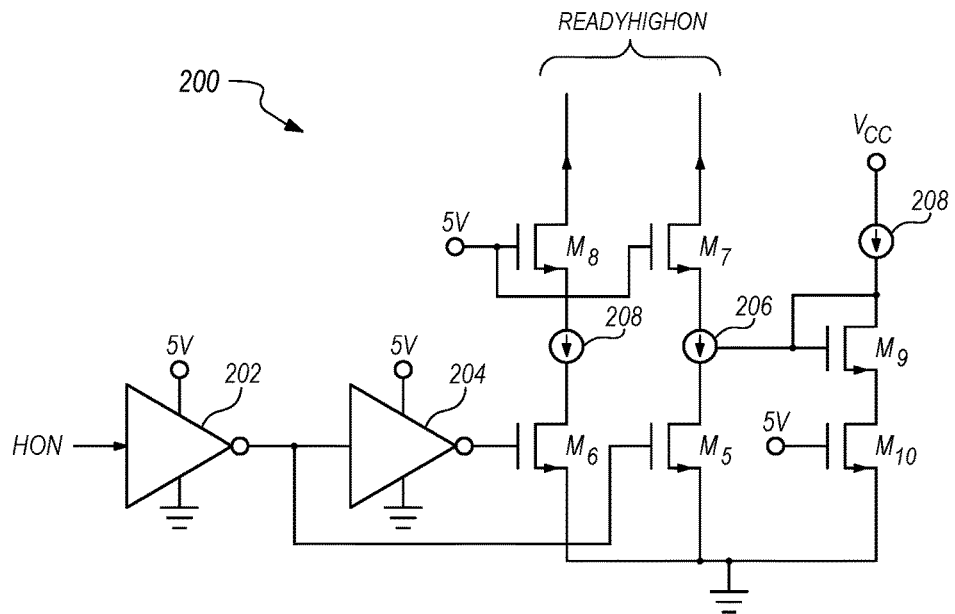
FIG. 11 illustrates a differential signal converter for use in control circuitry for a flyback converter in accordance with an embodiment of the present invention.

FIG. 11 illustrates a differential signal converter 200 for use in control circuitry for a flyback converter in accordance with an embodiment of the present invention. The differential signal converter 200 converts the single-ended signal HON to a differential logic signal READYHIGHON. The logic signal HON is coupled to an input of a first inverter 202. An output of the first inverter 202 is coupled to an input to a second inverter 204 and to control a MOSFET $M_5$. An output of the second inverter 204 is coupled to control a MOSFET $M_6$. A MOSFET $M_7$ and a current source 206 are coupled in series with the MOSFET $M_5$. A MOSFET $M_8$ and a current source 208 are coupled in series with the MOSFET $M_6$. A current source 208 is coupled in series with MOSFET $M_9$ and MOSFET $M_{10}$. A reference current passes through the MOSFETS $M_9$ and $M_{10}$. The signal HON activates one of the MOSFETS $M_5$ or $M_7$ dependent upon the level of HON. The reference current is mirrored in the MOSFET $M_8$ or in the MOSFET $M_7$ dependent upon which of the MOSFETS $M_5$ or $M_7$ is active. The state of the differential signal READYHIGHON is dependent upon which of the MOSFETS $M_5$ or $M_7$ is active. Thus, the converter 200 converts the logic signal HON to the differential logic signal READYHIGHON.

Figure 12:
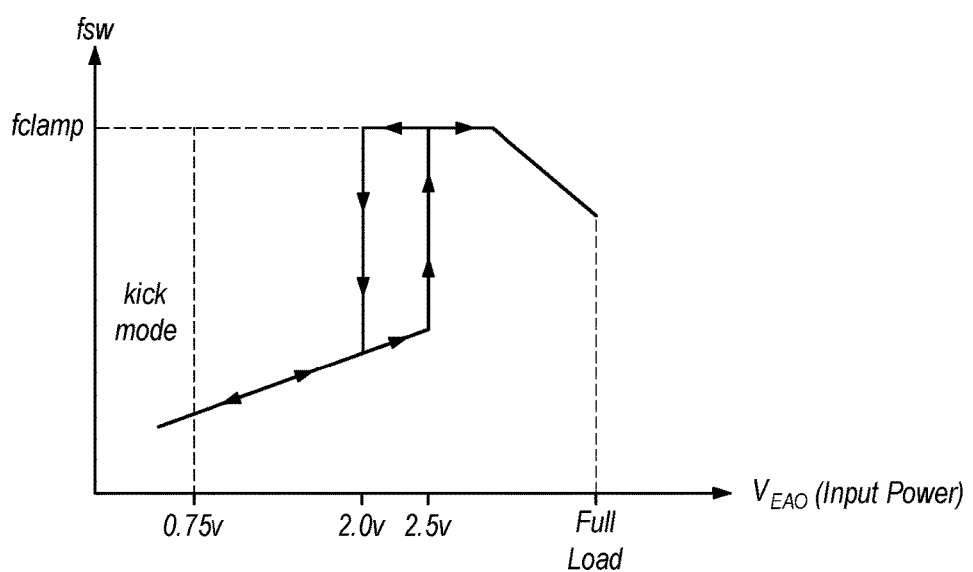
FIG. 12 illustrates a graph of switching frequency vs. power for a flyback converter in accordance with an embodiment of the present invention.

FIG. 12 illustrates a graph of switching frequency vs. power for a flyback converter in accordance with an embodiment of the present invention. Switching frequency $f_{sw}$ is plotted on the x-axis while input power, as measured by the signal $V_{EAO}$, is plotted on the y-axis. As shown in FIG. 12, when $V_{EAO}$ is below 0.75 volts, this indicates very light load conditions. In this mode, the flyback converter is preferably operated in "burst" mode. In such a burst mode, switching can be paused between "bursts" of switching for increased efficiency. Once the level of $V_{EAO}$ rises above 0.75 volts, the flyback converter can be operated in frequency control mode in which the switching frequency is modulated in a feedback loop to regulate the output voltage $V_O$. Once the level of $V_{EAO}$ surpasses a threshold of, for example, 2.5 volts, then the switching frequency is clamped to predetermined value $f_{clamp}$ and the flyback converter enters a current control mode. In this current control mode, the current level, as sensed by the signal Isense, is controlled in a feedback loop to regulate the output voltage. As the power level rises, the switching frequency can additionally be reduced, as shown in FIG. 12 as the power level approaches full load though voltage regulation is still primarily performed through the current control feedback loop.

As shown in FIG. 12, the switch frequency vs. power curve is discontinuous. When transitioning from frequency control to current control (e.g., when $V_{EAO}$ rises above 2.5 volts), the switching frequency is suddenly increased and the peak current in the transformer primary winding is at the same time reduced. Conversely, when transitioning from current control to frequency control (e.g., when $V_{EAO}$ falls below 2.0 volts), the switching frequency is suddenly reduced and the peak current in the transformer primary winding is at the same time increased. In both modes, negative feedback is employed to regulate the output voltage. It is therefore important that operation of the flyback converter remains stable as is transitions between the two modes of operation.

Figure 13:
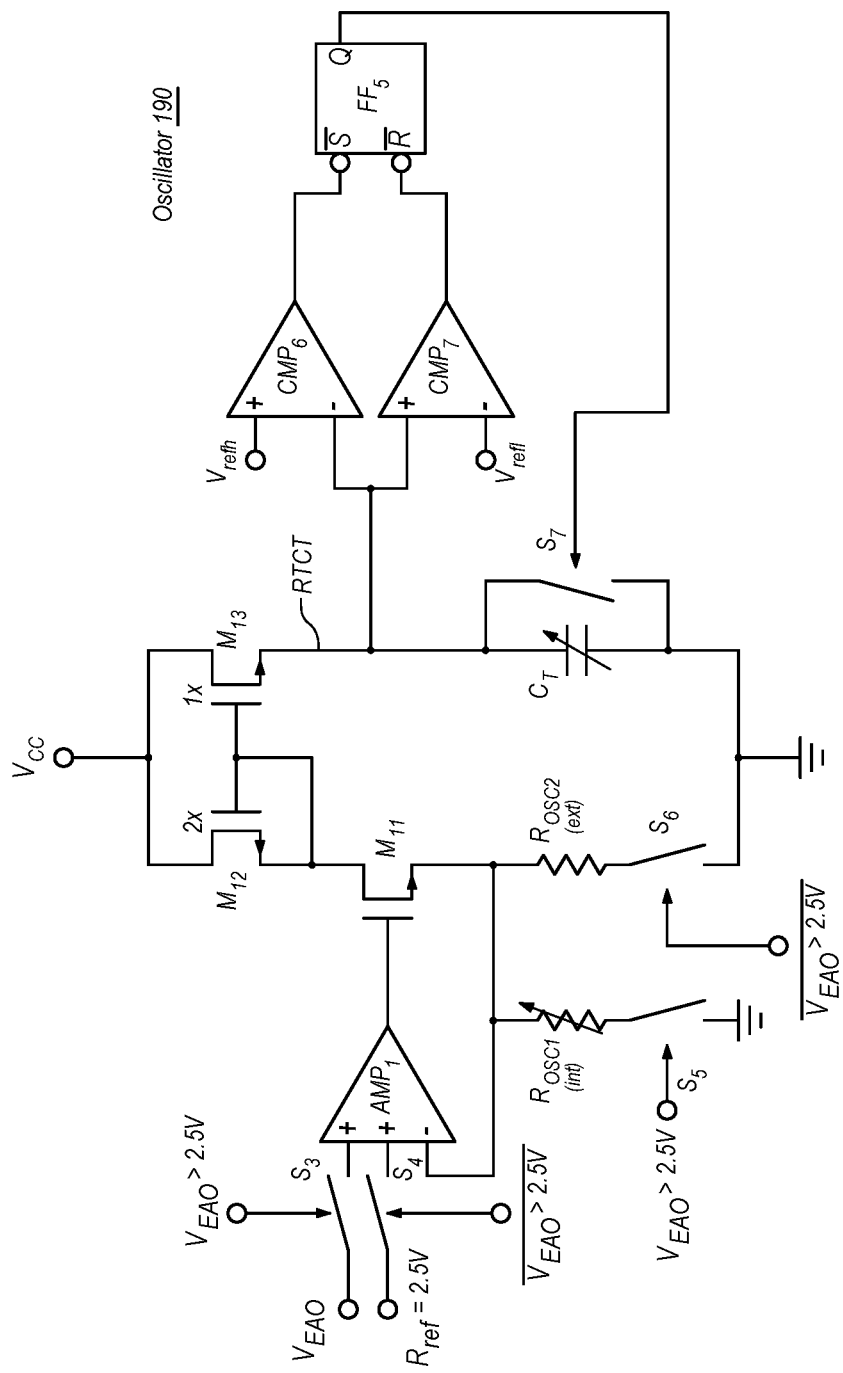
FIG. 13 illustrates an oscillator for use in control circuitry for a flyback converter in accordance with an embodiment of the present invention.

FIG. 13 illustrates an oscillator for use in control circuitry for a flyback converter in accordance with an embodiment of the present invention. FIG. 13 shows additional details of the oscillator 190 of FIG. 10. As shown in FIG. 13, the signal $V_{EAO}$ is coupled to a first input to an amplifier $AMP_1$ via a switch $S_3$. A reference voltage of, for example, 2.5 volts, is coupled to a second input of the amplifier $AMP_1$ via a switch $S_4$. A third input to the amplifier $AMP_1$ is coupled to a first terminal of an adjustable resistor $R_{OSC1}$ and to a first terminal of a resistor $R_{OSC2}$. An output of the amplifier $AMP_1$ is coupled to a control terminal of MOSFET $M_{11}$. An output terminal of the MOSFET $M_{11}$ is coupled to the first terminal of the resistor $R_{OSC1}$ and to the first terminal of the resistor $R_{OSC2}$. A second terminal of the resistor $R_{OSC1}$ is coupled to a ground node via a switch $S_5$. A second terminal of the resistor $R_{OSC2}$ is coupled to the ground node via a switch $S_6$.

A supply voltage VCC is coupled to an input terminal of a MOSFET $M_{12}$ and to an input terminal of a MOSFET $M_{13}$. An output terminal of the MOSFET $M_{12}$ is coupled to a control terminal of the MOSFET $M_{12}$, to a control terminal of the MOSFET $M_{13}$ and to an input terminal of the MOSFET $M_{11}$. An output terminal of the MOSFET $M_{13}$ is coupled to a first terminal of an adjustable capacitor $C_T$, to a first input terminal (inverting) to a comparator $CMP_6$ and to a first input terminal (non-inverting) to a comparator $CMP_7$. A second terminal of the adjustable capacitor $C_T$ is coupled to the ground node. A second input terminal to the comparator $CMP_6$ is coupled to a reference voltage Vrefh. A second input terminal to the comparator $CMP_7$ is coupled to a reference voltage Vrefl. An output of the comparator $CMP_6$ is coupled to an inverted set input S-bar of a flip-flop $FF_5$. An output of the comparator $CMP_7$ is coupled to an inverted reset input R-bar of the flip-flop $FF_5$. An output Q of the flip-flop $FF_5$ is coupled to control a switch $S_7$. The switch $S_7$ is coupled to across the capacitor $C_T$.

The switches $S_3$ and $S_5$ are controlled by the signal "$V_{EAO}$>2.5 v" while the switches $S_4$ and $S_6$ are controlled by the logic signal "$V_{EAO}$>2.5 v-bar". Thus, when $V_{EAO}$ is greater than the 2.5 volt threshold, the switches $S_3$ and $S_5$ are closed and the switches $S_4$ and $S_6$ are open; when $V_{EAO}$ is below the 2.0 volt threshold, the switches $S_4$ and $S_6$ are closed and the switches $S_3$ and $S_5$ are open. As explained herein, the signals "$V_{EAO}$>2.5 v" and its inverse "$V_{EAO}$>2.5 v-bar" are generated with hysteresis.

The oscillator 190 generates a periodic ramp signal RTCT across the capacitor $C_T$. The transistors $M_{12}$ and $M_{13}$ form a current mirror such that the current through the transistor $M_{13}$ charges the capacitor $C_T$. When the voltage across the capacitor $C_T$ reaches Vrefh, the capacitor $C_T$ is discharged by closing the switch $S_7$ until the voltage across the capacitor $C_T$ falls below Vrefl. The switch $S_7$ is then opened.

The frequency of the ramp signal RTCT is changed dependent upon of the state of the logic signal "$V_{EAO}$>2.5 v". More particularly, when $V_{EAO}$ is less than 2.0 volts (the signal "$V_{EAO}$>2.5 v" is a logic "0"), the flyback converter operates in the frequency control mode in which the switching frequency and is dependent upon the level of $V_{EAO}$. This is accomplished by closing the switch $S_3$ so that $V_{EAO}$ is coupled to the amplifier $AMP_1$ which turns on the MOSFET $M_{11}$ in relation to the level of $V_{EAO}$. The level of current in the current mirror of MOSFET $M_{12}$ and $M_{13}$ is, therefore, affected by the level of $V_{EAO}$ which, in turn, affects the rate of charging the capacitor $C_T$ and the frequency of the ramp signal RTCT. The frequency of the ramp signal RTCT is the same as the switching frequency of the flyback converter. Thus, in this frequency control mode, the switching frequency is controlled in a feedback loop to regulate the output voltage where the switching frequency is dependent upon $V_{EAO}$.

The frequency control mode continues unless $V_{EAO}$ rises above 2.5 volts. When $V_{EAO}$ rises above 2.5 volts and the signal "$V_{EAO}$>2.5 v" becomes a logic "1" then the switch $S_3$ is opened and the switch $S_4$ is closed which couples a fixed reference voltage to the input of the amplifier $AMP_1$ so that the current that charges the capacitor $C_T$ is essentially constant. This causes the switching frequency for the flyback converter to be essentially constant; in this mode, current is controlled in feedback loop to regulated the output voltage.

The frequency of the ramp signal RTCT and, thus, the switching frequency of the flyback converter is dependent upon the value of $C_T$ as well as the resistor $R_{OSC1}$ and $R_{OSC2}$. In the current control mode, the switch $S_6$ is closed so that the resistor $R_{OSC2}$ affects the switching frequency whereas the switch $S_5$ is opened so that the resistor $R_{OSC1}$ does not affect the switching frequency. In the frequency control mode, the switch $S_6$ opened so that the resistor $R_{OSC2}$ no longer affects the switching frequency and the switch $S_5$ is closed so that the resistor $R_{OSC1}$ does affect the switching frequency.

The values of $C_T$, $R_{OSC1}$ and $R_{OSC2}$ are selected so as to appropriately set the nominal switching frequency in the frequency control mode, as well as the essentially fixed switching frequency in the current control mode. Additionally, the values of the resistor $R_{OSC1}$ and the capacitor $C_T$ can preferably be fine-tuned, e.g. by laser or fuse trimming in order to ensure that there is a smooth transition between the frequency control and current control modes. For this purpose, the resistor ROSC1 is preferably incorporated into the IC package shown in FIG. 6.

Component selection for the oscillator can include first selecting a value for the resistor $R_{OSC2}$, which sets the clamping frequency $f_{clamp}$. Then, the capacitor $C_T$, which is preferably internal to the low driver controller IC 152, is trimmed to fine-tune the clamping frequency. Finally, the internal resistor ROSC1, which is also preferably internal to the low driver controller IC 152, is trimmed to fine-tune the switching frequency at the transition between current control and frequency control modes of operation.

Figure 14:
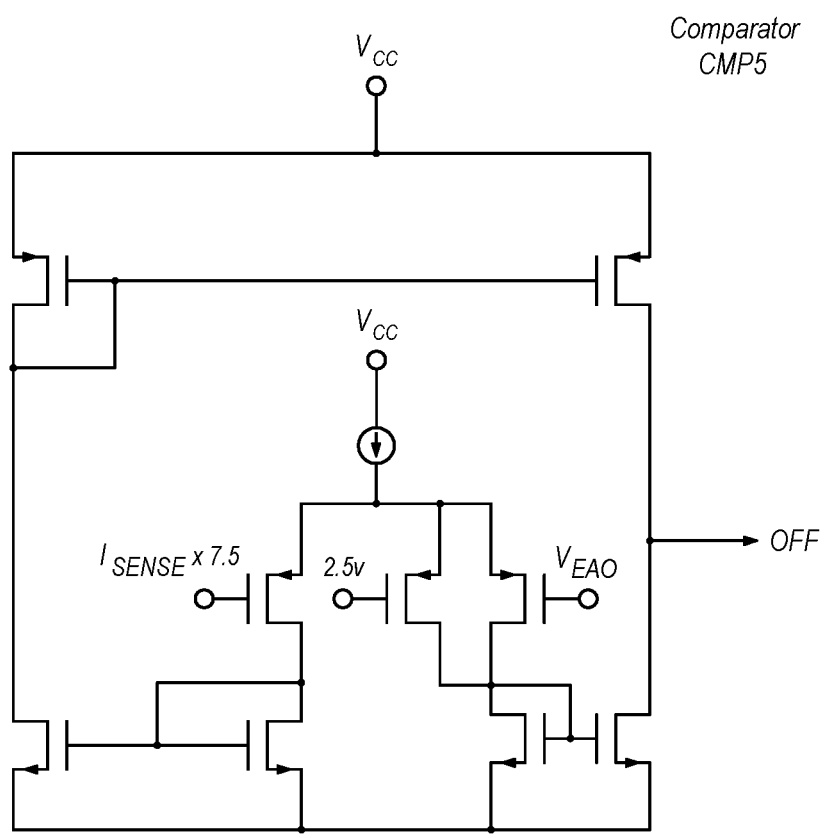
FIG. 14 illustrates a comparator for use in control circuitry for a flyback converter in accordance with an embodiment of the present invention.

FIG. 14 illustrates a comparator for use in control circuitry for a flyback converter in accordance with an embodiment of the present invention. The comparator of FIG. 14 can be used in place of the comparator CMP5 shown in the frequency mode control section 174 of FIG. 10. As shown in FIGS. 10 and 14, the comparator accepts as input the signal $I_{SENSE}$×7.5 which is compared to a reference voltage of 2.5 volts for generating the signal OFF. The signal OFF is used to turn off the main switch SW$_1$. The comparator of FIG. 14 additionally accepts as input the signal V$_{EAO}$. The signal V$_{EAO}$ reduces the effective level of the reference voltage thereby generating the signal OFF sooner and therefore reducing the switching frequency. This is useful to reduce switching noise in burst mode.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A switching power supply comprising:
a power converter having a transformer, a low side switch configured to draw current from a supply voltage through a primary winding of the transformer and a high side switch configured to discharge current from the primary winding of the transformer to a snubber capacitor; and
a controller configured to synchronously control opening and closing of the low side switch and the high side switch, wherein the low side switch and the high side switch are each repeatedly opened and closed so as to form a regulated output voltage in a feedback loop, the regulated output voltage being formed from a current induced in a secondary winding of the transformer, and wherein the controller is configured to adjust a time instant of closing the high side switch within each switching cycle upon detection of a one or more of a load condition or a supply voltage condition.

2. The switching power supply according to claim 1, wherein the power converter is a flyback converter configured to perform DC-to-DC power conversion.

3. The switching power supply according to claim 1, wherein the load condition comprises a light load condition.

4. The switching power supply according to claim 3, wherein the light load condition is detected by a feedback error signal falling below a threshold.

5. The switching power supply according to claim 1, wherein the supply voltage condition is detected by the supply voltage exceeding a threshold value.

6. The switching power supply according to claim 1, wherein the load condition and the supply voltage condition each have two possible states.

7. The switching power supply according to claim 1, wherein during each switching cycle, the high side switch is held open while the low side switch is closed and then opened and wherein the low side switch is held open while the high side switch is closed and then opened.

8. The switching power supply according to claim 1, wherein a first voltage is generated at a node between the low side switch and the high side switch during operation of the low side switch and wherein the high side switch is closed based on a comparison of the supply voltage to the first voltage.

9. The switching power supply according to claim 8, wherein the high side switch is operated in accordance with zero volt switching.

10. The switching power supply according to claim 8, wherein the supply voltage is sensed by a high voltage resistor coupled to the supply voltage.

11. The switching power supply according to claim 10, wherein a controller integrated circuit package comprises the controller and wherein the controller integrated circuit package comprises the high voltage resistor.

12. The switching power supply according to claim 10, further comprising a capacitor coupled in parallel with the high voltage resistor.

13. The switching power supply according to claim 8, wherein the controller comprises a high side driver controller that controls the high side switch and wherein a signal informs the high side driver controller that the high side driver controller has permission to close the high side switch.

14. The switching power supply according to claim 13, wherein after the high side driver controller receives permission to close the high side switch, the high side driver controller closes the high side switch when the first voltage reaches a level that is nearly equal to a level of the supply voltage.

15. The switching power supply according to claim 13, wherein the controller comprises a low side driver controller that controls the low side switch and wherein the low side driver controller and the high side driver controller have different ground reference voltages and wherein the low side driver controller communicates with the high side driver controller via a differential signal.

16. The switching power supply according to claim 1, wherein the power converter is configured to selectively operate in: (1) a frequency control mode in which frequency of switching is controlled in a frequency control mode feedback loop to regulate the output voltage; and (2) a current control mode in which peak current in the primary winding of the transformer for each switch cycle is controlled in a current control mode feedback loop for regulating the output voltage.

17. The switching power supply according to claim 16, wherein the power converter operates in the frequency control mode below a first load power threshold and wherein the power converter transitions to the current control mode when a load power exceeds the first load power threshold.

18. The switching power supply according to claim 17, wherein the power converter transitions from the current control mode to the frequency control mode when the load power falls below a second load power threshold, the second load power threshold being lower than the first load power threshold, thereby the power converter transitions between the frequency control mode and the current control mode based on the load power and with hysteresis.

19. The switching power supply according to claim 18, wherein switching frequency changes suddenly upon the power converter transitioning between the current control mode and the frequency control mode.

20. The switching power supply according to claim 16, wherein the power converter operates in the frequency control mode when the supply voltage condition indicates that the supply voltage exceeds a threshold value.

21. A switching power supply comprising:
a power converter having a transformer, a low side switch configured to draw current from a supply voltage through a primary winding of the transformer and a high side switch configured to discharge current from the primary winding of the transformer to a snubber capacitor; and
a controller configured to synchronously control the opening and closing of the low side switch and the high side switch, wherein the low side switch and the high side switch are each repeatedly opened and closed so as to form a regulated output voltage, the regulated output voltage being formed from a current induced in a secondary winding of the transformer, and wherein the controller is configured to selectively operate in: (1) a frequency control mode in which frequency of switching is controlled in a frequency control mode feedback loop to regulate the regulated output voltage; and (2) a current control mode in which peak current in the primary winding of the transformer for each switch cycle is controlled in a current control mode feedback loop for regulating the regulated output voltage, wherein the controller operates in the frequency control mode upon detection of a supply voltage condition.

22. The switching power supply according to claim 21, wherein the power converter is a flyback converter configured to perform DC-to-DC power conversion.

23. The switching power supply according to claim 21, wherein the controller is configured to adjust a time instant of closing the high side switch within each switching cycle upon detection of a load condition.

24. The switching power supply according to claim 23, wherein the load condition comprises a light load condition.

25. The switching power supply according to claim 24, wherein the light load condition is detected by a feedback error signal falling below a threshold.

26. The switching power supply according to claim 21, wherein the supply voltage condition is detected by the supply voltage exceeding a threshold value.

27. The switching power supply according to claim 21, wherein the load condition and the supply voltage condition each have two possible states.

28. The switching power supply according to claim 21, wherein during each switching cycle, the high side switch is held open while the low side switch is closed and then opened and wherein the low side switch is held open while the high side switch is closed and then opened.

29. The switching power supply according to claim 21, wherein a first voltage is generated at a node between the low side switch and the high side switch during operation of the low side switch and wherein the high side switch is closed based on a comparison of the supply voltage to the first voltage.

30. The switching power supply according to claim 29, wherein the high side switch is operated in accordance with zero volt switching.

31. The switching power supply according to claim 29, wherein the supply voltage is sensed by a high voltage resistor coupled to the supply voltage.

32. The switching power supply according to claim 31, wherein a controller integrated circuit package comprises the controller and wherein the controller integrated circuit package comprises the high voltage resistor.

33. The switching power supply according to claim 31, further comprising a capacitor coupled in parallel with the high voltage resistor.

34. The switching power supply according to claim 29, wherein the controller comprises a high side driver controller that controls the high side switch and wherein a signal informs the high side driver controller that the high side driver controller has permission to close the high side switch.

35. The switching power supply according to claim 34, wherein after the high side driver controller receives permission to close the high side switch, the high side driver controller closes the high side switch when the first voltage reaches a level that is nearly equal to a level of the supply voltage.

36. The switching power supply according to claim 34, wherein the controller comprises a low side driver controller that controls the low side switch and wherein the low side driver controller and the high side driver controller have different ground reference voltages and wherein the low side driver controller communicates with the high side driver controller via a differential signal.

37. The switching power supply according to claim 21, wherein the power converter operates in the frequency control mode below a first load power threshold and wherein the power converter transitions to the current control mode when a load power exceeds the first load power threshold.

38. The switching power supply according to claim 37, wherein the power converter transitions from the current control mode to the frequency control mode when the load power falls below a second load power threshold, the second load power threshold being lower than the first load power threshold, thereby the power converter transitions between the frequency control mode and the current control mode based on the load power and with hysteresis.

39. The switching power supply according to claim 38, wherein switching frequency changes suddenly upon the power converter transitioning between the current control mode and the frequency control mode.

40. A switching power supply comprising:
a power converter having a transformer, a low side switch configured to draw current from a supply voltage through a primary winding of the transformer and a high side switch configured to discharge current from the primary winding of the transformer to a snubber capacitor; and
a controller configured to synchronously control opening and closing of the low side switch and the high side switch, wherein the low side switch and the high side switch are each repeatedly opened and closed so as to form a regulated output voltage, the regulated output voltage being formed from a current induced in a secondary winding of the transformer, and wherein the controller is configured to selectively control opening and closing of the low side switch in: (1) a frequency control mode in which frequency of switching is controlled in a frequency control mode feedback loop to regulate the regulated output voltage; and (2) a current control mode in which peak current in the primary winding of the transformer for each switch cycle is controlled in a current control mode feedback loop for regulating the regulated output voltage, and wherein the controller is configured to adjust a time instant of closing the high side switch within each switching cycle upon detection of a one or more of a load condition or a supply voltage condition.

41. The switching power supply according to claim 40, wherein the controller operates in the frequency control mode upon detection of a supply voltage condition.

42. The switching power supply according to claim 40, wherein the power converter is a flyback converter configured to perform DC-to-DC power conversion.

43. The switching power supply according to claim 40, wherein the load condition comprises a light load condition and wherein the light load condition is detected by a feedback error signal falling below a threshold.

44. The switching power supply according to claim 40, wherein the supply voltage condition is detected by the supply voltage exceeding a threshold value.

45. The switching power supply according to claim 40, wherein during each switching cycle, the high side switch is held open while the low side switch is closed and then opened and wherein the low side switch is held open while the high side switch is closed and then opened.

46. The switching power supply according to claim 40, wherein a first voltage is generated at a node between the low side switch and the high side switch during operation of the low side switch and wherein the high side switch is closed based on a comparison of the supply voltage to the first voltage.

47. The switching power supply according to claim 46, wherein the high side switch is operated in accordance with zero volt switching.

48. The switching power supply according to claim 46, wherein the controller comprises a high side driver controller that controls the high side switch and wherein a signal informs the high side driver controller that the high side driver controller has permission to close the high side switch.

49. The switching power supply according to claim 48, wherein after the high side driver controller receives permission to close the high side switch, the high side driver controller closes the high side switch when the first voltage reaches a level that is nearly equal to a level of the supply voltage.

50. The switching power supply according to claim 48, wherein the controller comprises a low side driver controller that controls the low side switch and wherein the low side driver controller and the high side driver controller have different ground reference voltages and wherein the low side driver controller communicates with the high side driver controller via a differential signal.

51. The switching power supply according to claim 40, wherein the power converter operates in the frequency control mode below a first load power threshold and wherein the power converter transitions to the current control mode when a load power exceeds the first load power threshold.

52. The switching power supply according to claim 51, wherein the power converter transitions from the current control mode to the frequency control mode when load power falls below a second load power threshold, the second load power threshold being lower than the first load power threshold, thereby the power converter transitions between the frequency control mode and the current control mode based on load power and with hysteresis.

53. The switching power supply according to claim 52, wherein switching frequency changes suddenly upon the power converter transitioning between the current control mode and the frequency control mode.

* * * * *